March 19, 1957 E. HOFFMEISTER 2,785,464
HEADS FOR ANGLE-PIECES, MORE ESPECIALLY
FOR DENTISTRY PURPOSES
Filed Dec. 29, 1953
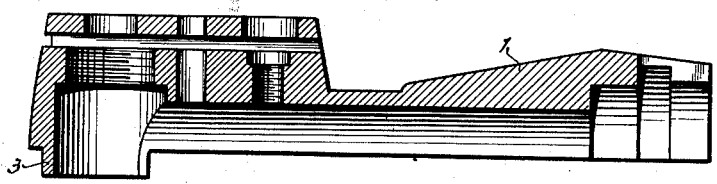
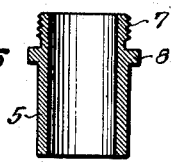
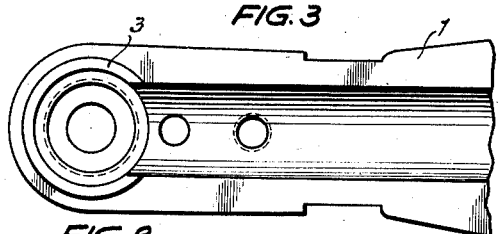
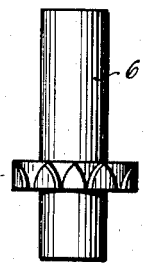
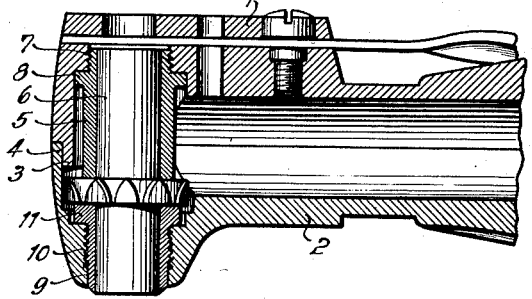
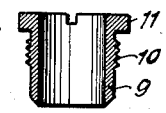
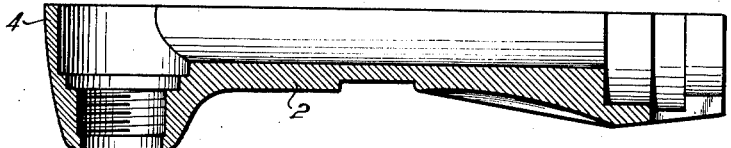
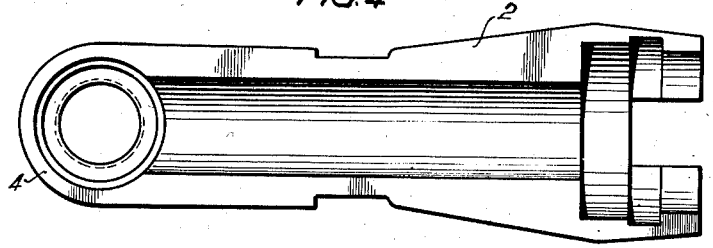

United States Patent Office 2,785,464
Patented Mar. 19, 1957

2,785,464

HEADS FOR ANGLE-PIECES, MORE ESPECIALLY FOR DENTISTRY PURPOSES

Erich Hoffmeister, Biberach (Riss), Germany

Application December 29, 1953, Serial No. 400,993

Claims priority, application Germany September 7, 1953

2 Claims. (Cl. 32—27)

This invention relates to heads for angle-pieces intended more especially for dentistry purposes, and of the kind which include parts or halves separable along a plane substantially at right-angles to the axis of an associated overhead drive.

In the known heads of this kind, the centering of the two parts or halves of the head is effected by a bearing for the overhead drive, which bearing is fitted into the upper part or half of the head. For this purpose, this bearing which projects from, or beyond, the plane of separation of the parts or halves of the head, may be provided with an outer collar, which collar engages in a corresponding bore formed in the lower part or half of the head.

It has now been shown that it is more expedient, for purposes of manufacture and assembly, for the centering of the parts or halves of the head to be effected independently of the bearings for the overhead drive. This is particularly of importance when worn bearings have to be replaced by new bearings.

Accordingly, the present invention provides an arrangement wherein one part of the head is provided with a collar adapted to engage in a corresponding bore or recess in the other part of the head, for the purpose of centering the two parts when the head is assembled, and wherein each part is adapted to receive a removable bearing for the overhead drive, the arrangement being such that each bearing may be inserted into its associated part from the side of the latter defined by the separation plane, thereby to provide for the ready replacement of said bearings.

According to a further feature of the invention, the bearings for the overhead drive may be formed in such a manner that they can be screwed into the associated parts of the head.

For a better understanding of the invention, the same will now be described, by way of example, with reference to the accompanying drawings, in which:

Figure 1 shows in longitudinal section, the top half, or one part, of an angle-piece head, Figure 2 shows in longitudinal section, the bottom half, or the other part, of the head, Figure 3 is a fragmentary underneath plan view of the top half shown in Figure 1, Figure 4 is a plan view of the bottom half of the head shown in Figure 2, Figure 5 is a longitudinal section through a bearing for the overhead drive, said bearing being adapted to be screwed into the top half of the head, Figure 6 is a longitudinal section through a bearing for the overhead drive, said bearing being adapted to be screwed into the bottom half of the head, Figure 7 is a side elevation of the overhead drive, Figure 8 is a longitudinal section showing the assembled top and bottom halves of the head, including the overhead drive and the bearings therefor.

The head, which is divided longitudinally along a plane at right-angles to the axis of the overhead drive, consists of a top half 1 and a bottom half 2. The top half 1 of the head is formed, for centering purposes in relation to the bottom half 2, with a collar 3 which projects from the dividing or separation plane of the halves of the head and which engages in a corresponding bore or recess 4 in the bottom half 2. It is possible in this manner for the two halves of the head to be accurately fitted together. The bearing 5 for the overhead drive 6 is screwed by means of a screw-threaded portion 7 into the top half 1 of the head until the upper face of a collar 8 abuts against an annular shoulder formed in the said top half. The bearing 9 for the overhead drive 6 is screwed by means of a screw-threaded part 10 into an internally threaded bore in the bottom half 2 of the head, the bearing 9 having a collar 11 adapted to determine the final position of the bearing 9 in the bottom half 2 by engagement with a corresponding annular shoulder formed in said bottom half. The bearings 5 and 9 for the overhead drive 6 can easily be screwed out, when worn, and replaced by new bearings. When changing the bearings, the centering of the two halves of the head is not affected in any way, since the centering of these two halves is completely independent of the bearings for the overhead drive.

I claim:

1. A head for angle-pieces, more especially for dentistry purposes, said head comprising two separable parts engageable in a plane extending longitudinally of said parts, means for centering said parts, said means including a collar on one part engageable in a corresponding recess in the other part, an overhead drive, a replaceable bearing in each of said parts for said overhead drive member, and means for permitting the insertion and removal of said bearings from the plane of separation of said parts.

2. A head for angle-pieces, more especially for dentistry purposes, said head comprising two separable and co-operating parts, portions on said parts having surface contact in a plane of separation extending longitudinally of said parts, means for centering said parts, said means including a collar on one part engageable in a corresponding recess in the other part, an overhead drive, a replaceable bearing in each of said parts for said overhead drive, a screw-threaded bore in each part for the associated bearing, each screw-threaded bore opening into the plane of separation to permit the screwing of the bearing into and out of the bore from said plane of separation.

References Cited in the file of this patent

UNITED STATES PATENTS

| | | |
|---|---|---|
| 1,838,982 | Angell | Dec. 29, 1931 |
| 2,090,885 | Clark | Aug. 24, 1937 |